United States Statutory Invention Registration [19]

[11] Reg. Number: H683

Brubaker [43] Published: Oct. 3, 1989

[54] METHOD FOR RELOADING A VERTICAL LAUNCHING SYSTEM WITH MISSILES FROM A SUPPLY SHIP

[75] Inventor: James E. Brubaker, Pittsburgh, Pa.

[73] Assignee: The United States of America as represented by the Secretary of the Navy, Washington, D.C.

[21] Appl. No.: 315,755

[22] Filed: Feb. 27, 1989

[51] Int. Cl.[4] ..... F41F 3/04; F41F 9/00

[52] U.S. Cl. ..... 89/1.802; 89/1.805; 414/282; 414/283; 414/137.9; 414/22.54

[56] References Cited

U.S. PATENT DOCUMENTS 4,363,257 12/1982 Harris ..... 89/1.8

*Primary Examiner*—David H. Brown

*Attorney, Agent, or Firm*—Kenneth W. Dobyn; Alan P. Klein; Sol Sheinbein

[57] ABSTRACT

A method of loading a cell of a vertical launching system missile launcher on a combatant ship with a canistered missile from a supply ship wherein the canistered missile is transferred from the supply ship to a fixed guide on the deck of the combatant ship, upended in the guide, moved away to a position over the cell of the missile launcher, and then lowered into the cell.

14 Claims, 8 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR RELOADING A VERTICAL LAUNCHING SYSTEM WITH MISSILES FROM A SUPPLY SHIP

BACKGROUND OF THE INVENTION

This invention relates in general to missile launching and more particularly, to methods for transferring a missile to a launcher.

In the past, the conventional method for reloading a vertical launching system (VLS) with missiles from a supply ship has required numerous, time-consuming manhandling, repositioning, and preparatory operations carried out in succession on the deck of a combatant ship being reloaded.

SUMMARY OF THE INVENTION

It is therefore one object of this invention to eliminate many of these operations or perform them on a supply ship where they will take place off the critical path.

It is another object to reduce the time required to reload a VLS.

The objects of the invention are achieved by a method of loading a cell of a VLS missile launcher with a canistered missile from a supply ship wherein the canistered missile is transferred from the supply ship to a fixed guide on the deck of the combatant ship, upended in the guide, moved away to a position over the cell of the missile launcher, and then lowered into the cell. A canistered missile is a missile sealed in a canister which serves as both a launch tube and shipping container for the missile.

Advantages of this invention include the capability of achieving canistered missile loading rates of 20 missiles per hour, and the reduced chance of injury to personnel or damage to the missile from rough seas because manhandling of the loose canister or other heavy equipment on deck is eliminated.

Additional advantages and features will become more apparent as the subject invention becomes better understood by reference to the following detailed description when considered in conjunction with the accompanying drawings wherein:

DETAILED DESCRIPTION

Referring to FIGS. 1 to 8, a method of loading a cell of a VLS missile launcher on a combatant ship with a canistered missile from a supply ship includes a first step 1 in which the canistered missile is transferred from the supply ship to a fixed guide on the deck of the combatant ship.

Figure 1:
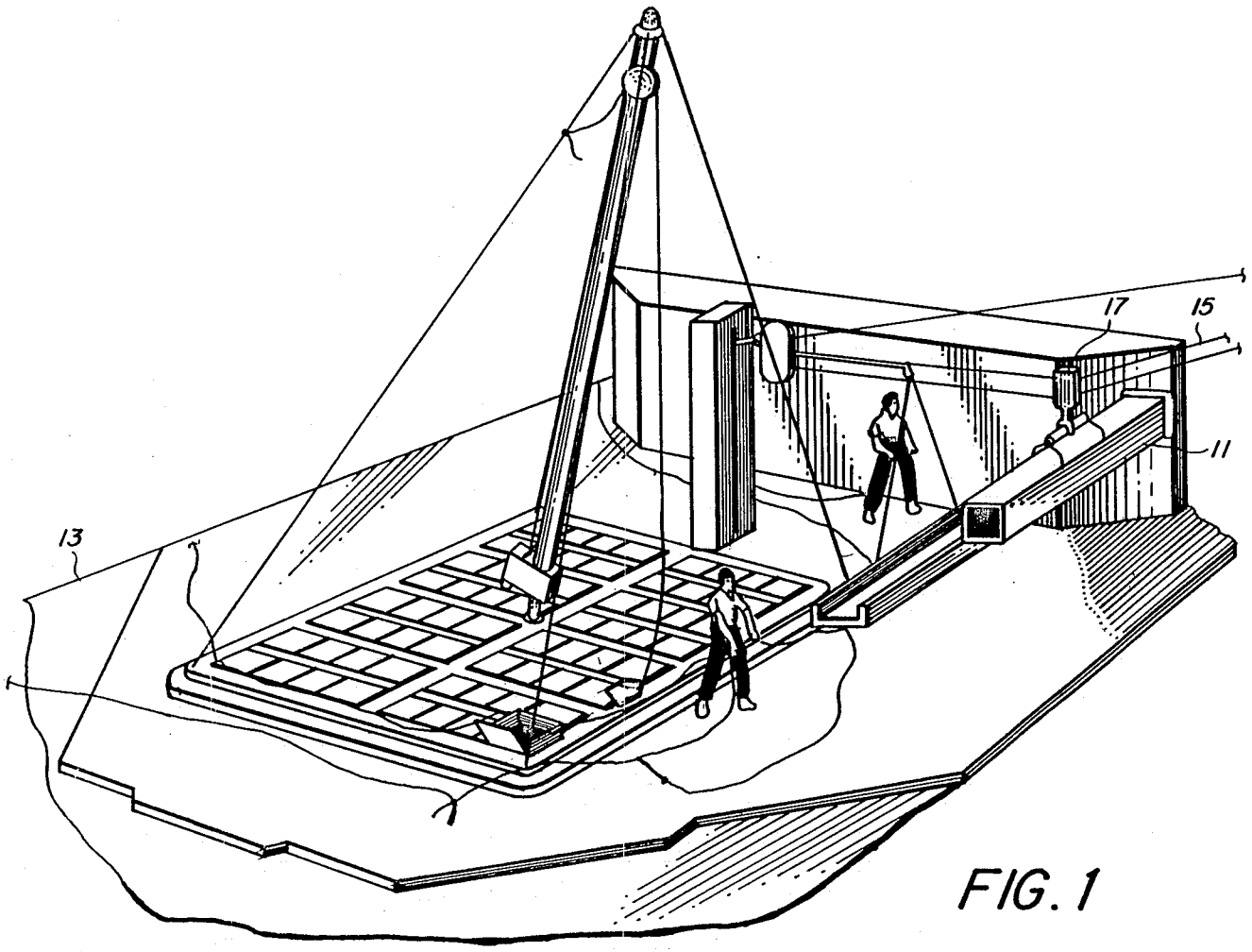
FIGS. 1 to 8 show the acts making up the various steps in an embodiment of the method of loading a cell of a VLS missile launcher on a combatant ship with a canistered missile from a supply ship in accordance with the invention.
Figure 2:
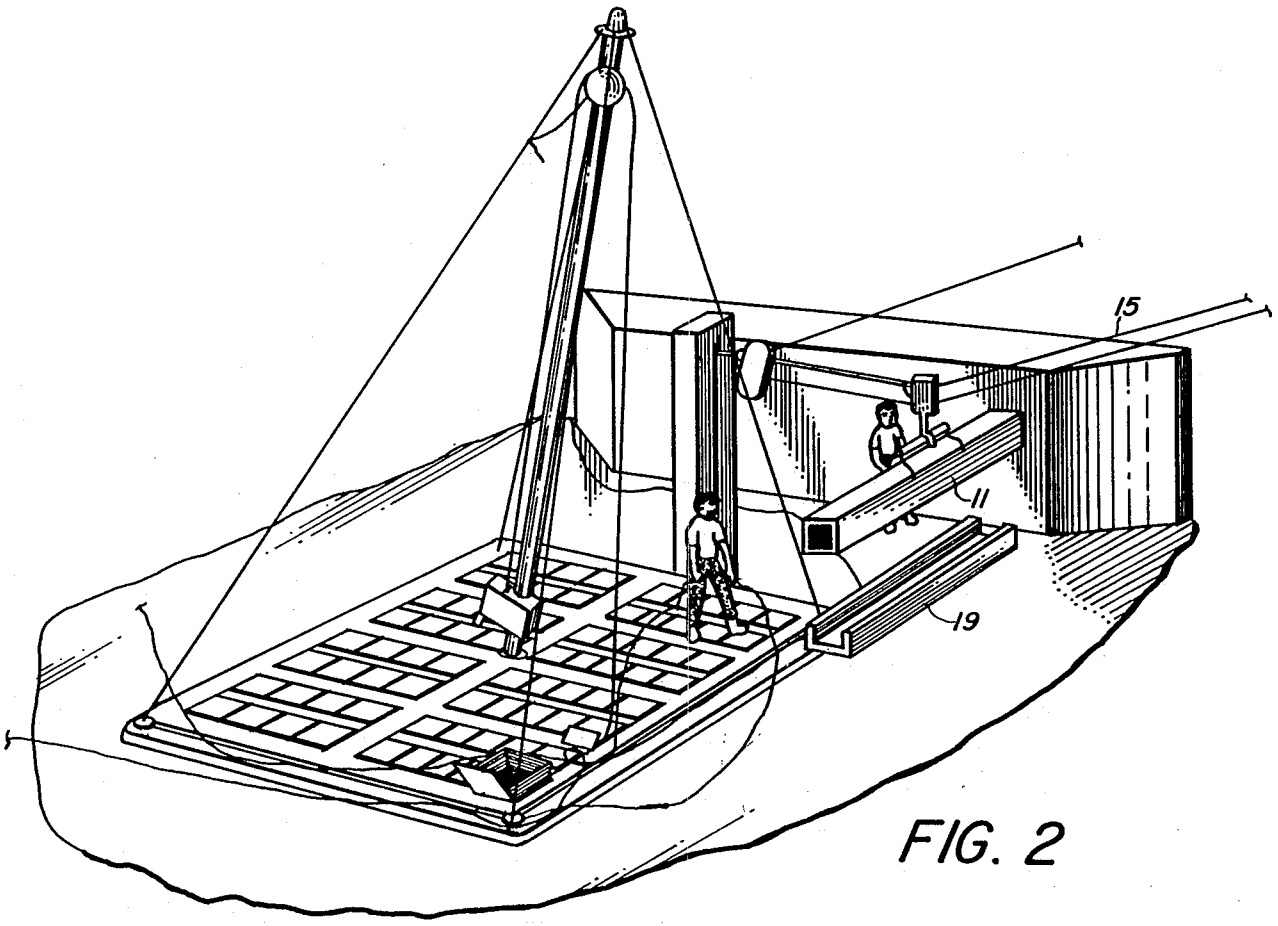
Figure 3:
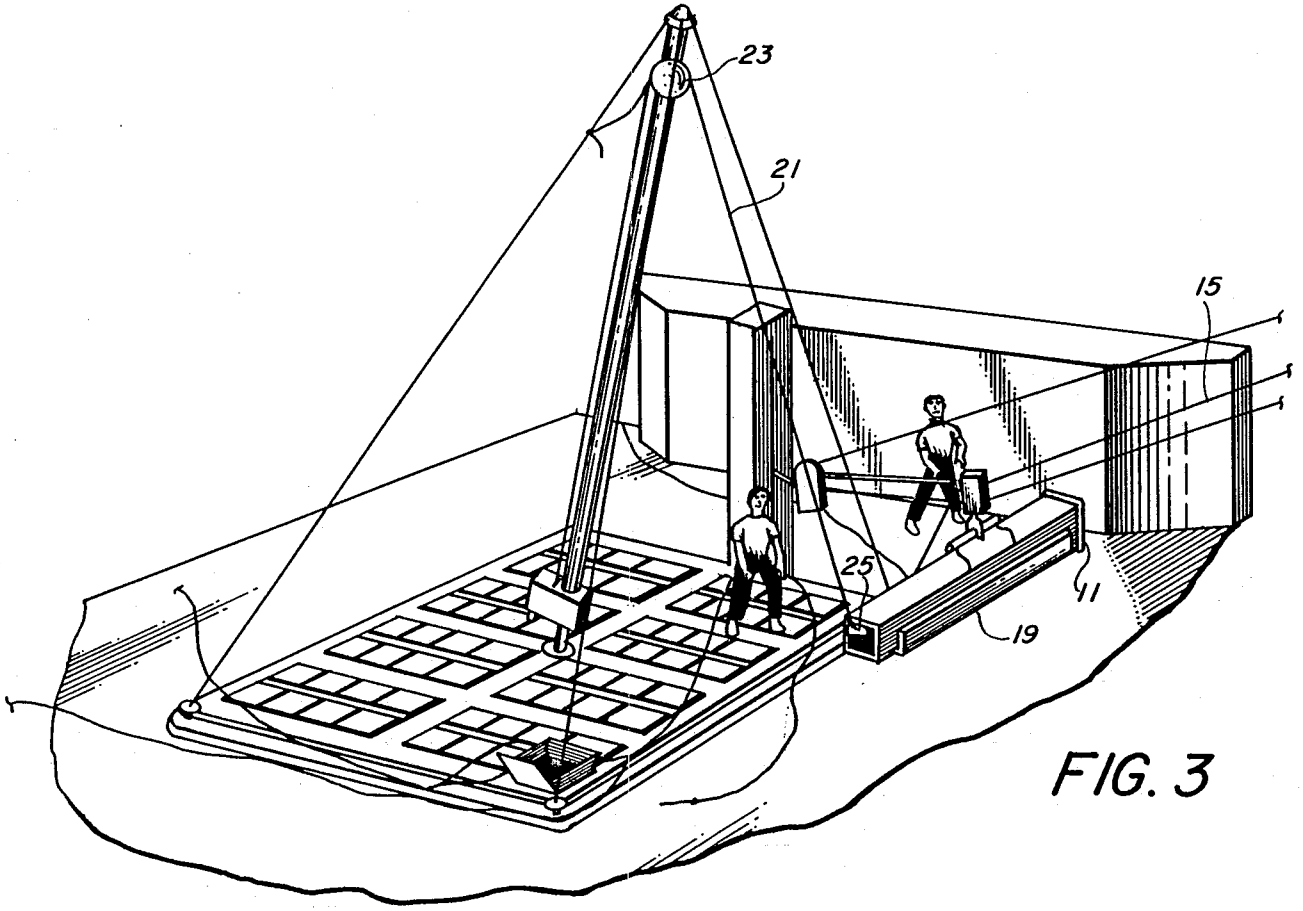

While step 1 may take a variety of forms, conveniently it may take the form of conveying the canistered missile 11 from the supply ship (not shown) to the combatant ship 13 by means of a ropeway 15 using a first strongback 17 (as shown in FIG. 1); positioning the canistered missile 11 on the ropeway 15 over the fixed guide 19 (as shown in FIG. 2); and lowering the ropeway 15 to deposit the canistered missile 11 in the guide 19 (as shown in FIG. 3).

In step 2, the canistered missile is upended in the guide.

Figure 4:
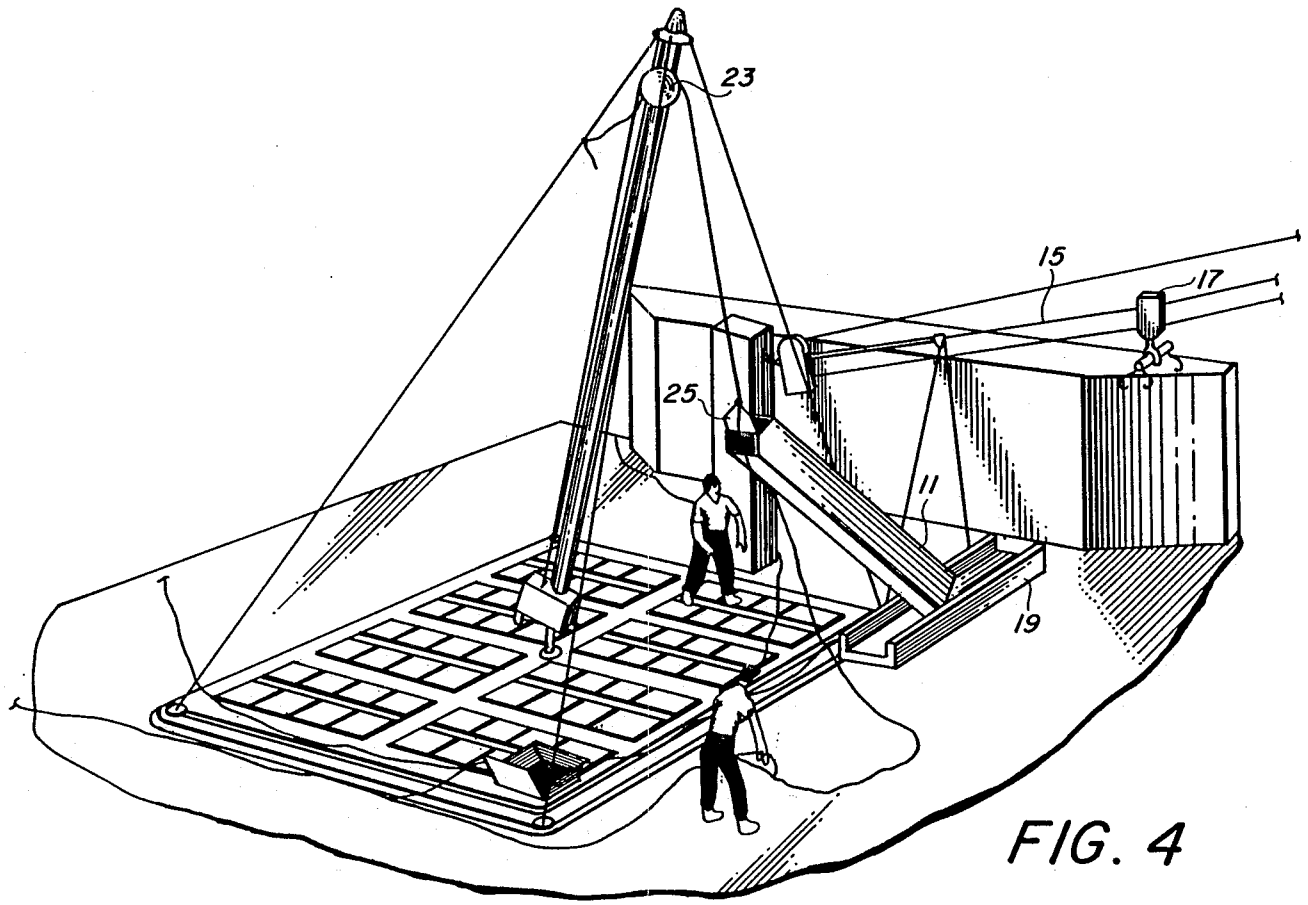

While step 2 may take a variety of forms, conveniently it may take the form of connecting a suspension cable 21 from a boom winch 23 to one end of the canistered missile 11 by means of a second strongback 25 (as shown in FIG. 3); disconnecting the first strongback 17 from the canistered missile 11 (as shown in FIG. 4); raising the ropeway 15 and returning the first strongback 17 to the supply ship (as shown in FIG. 4); and hoisting the second strongback 25 by means of the boom winch 23 to upend the canistered missile 11 in the guide 19 (shown in FIG. 4).

Next, step 3 is performed whereby the upended canistered missile is moved away from the guide to a position over the cell of the missile launcher.

Figure 5:
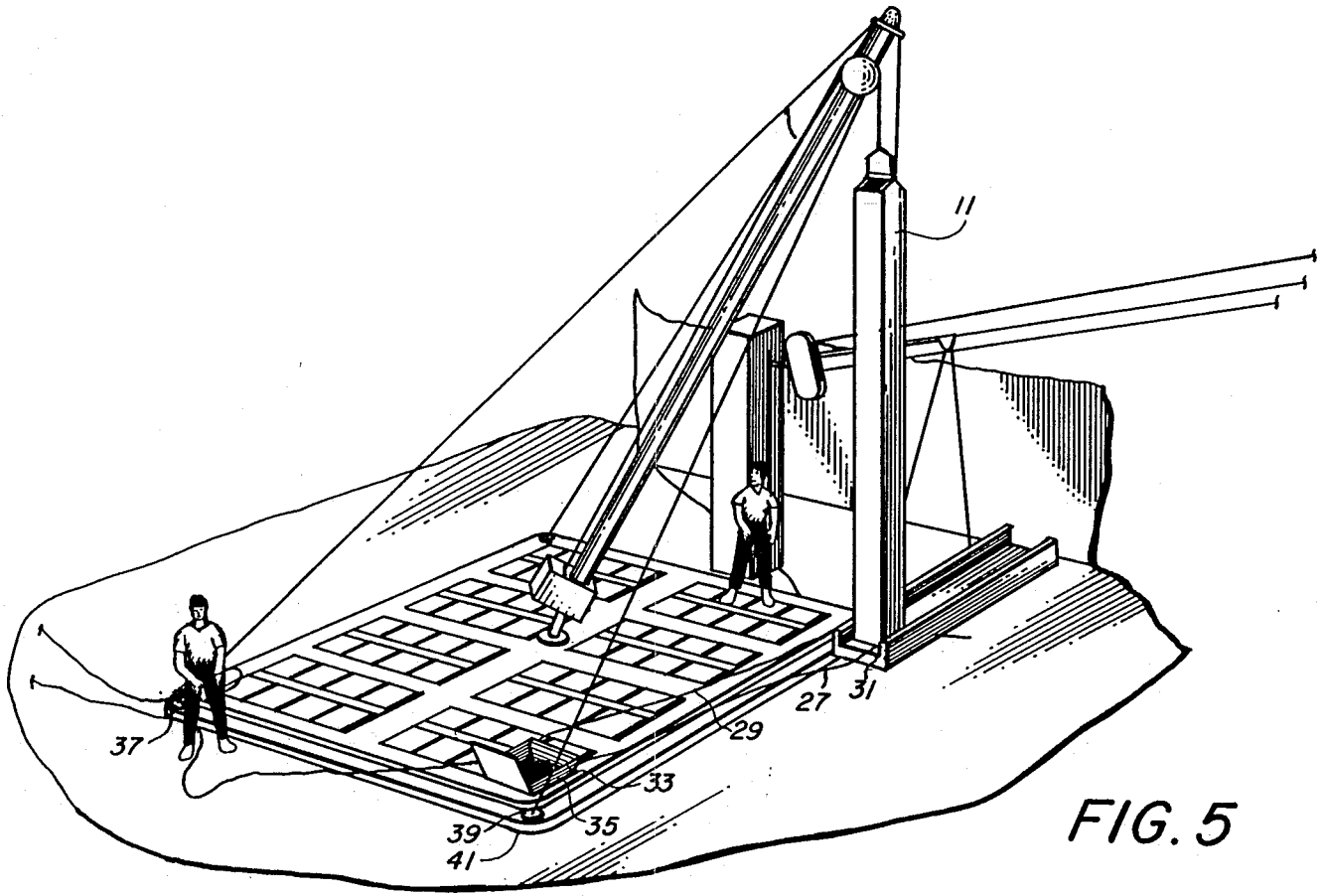
Figure 6:
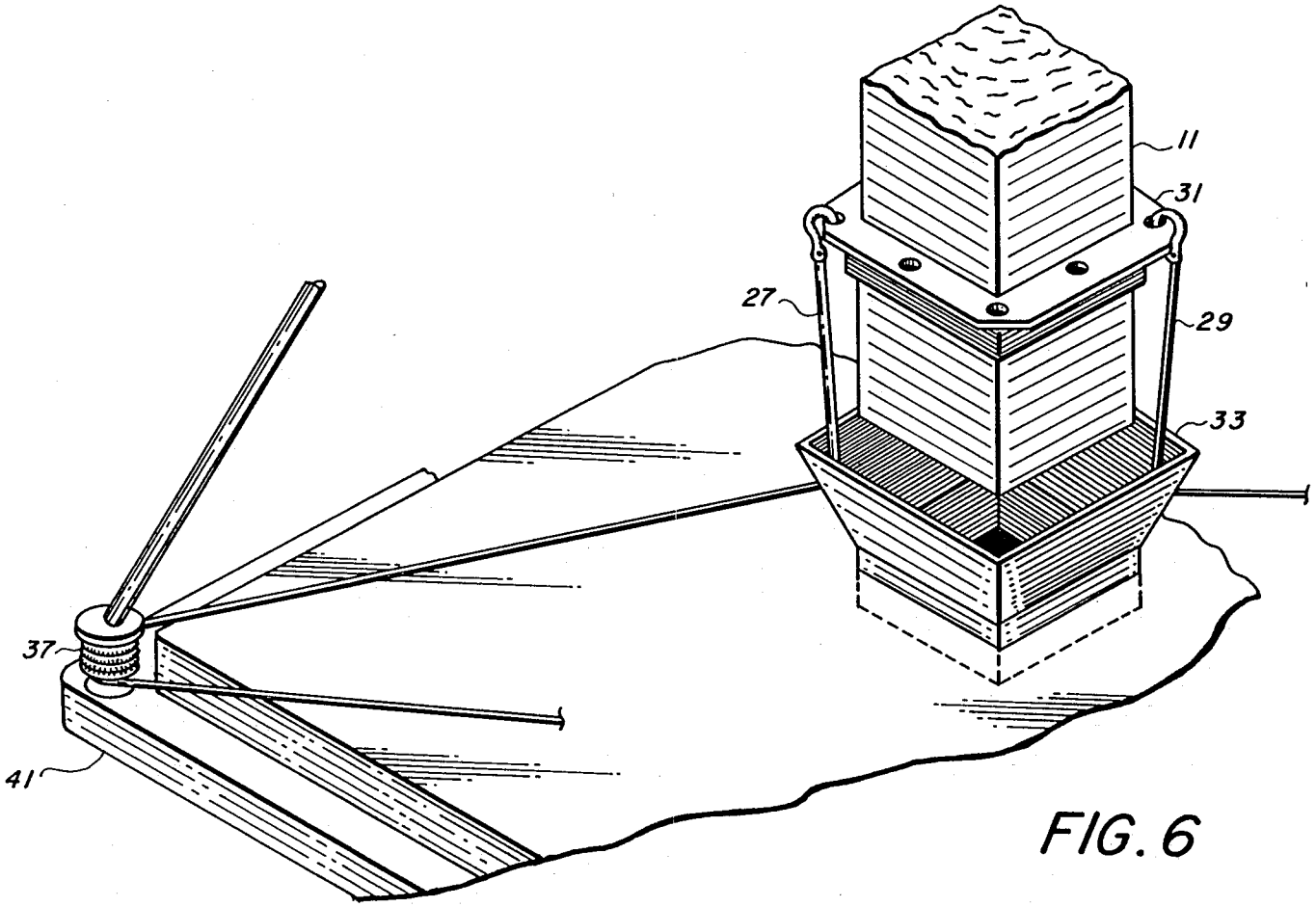
Figure 7:
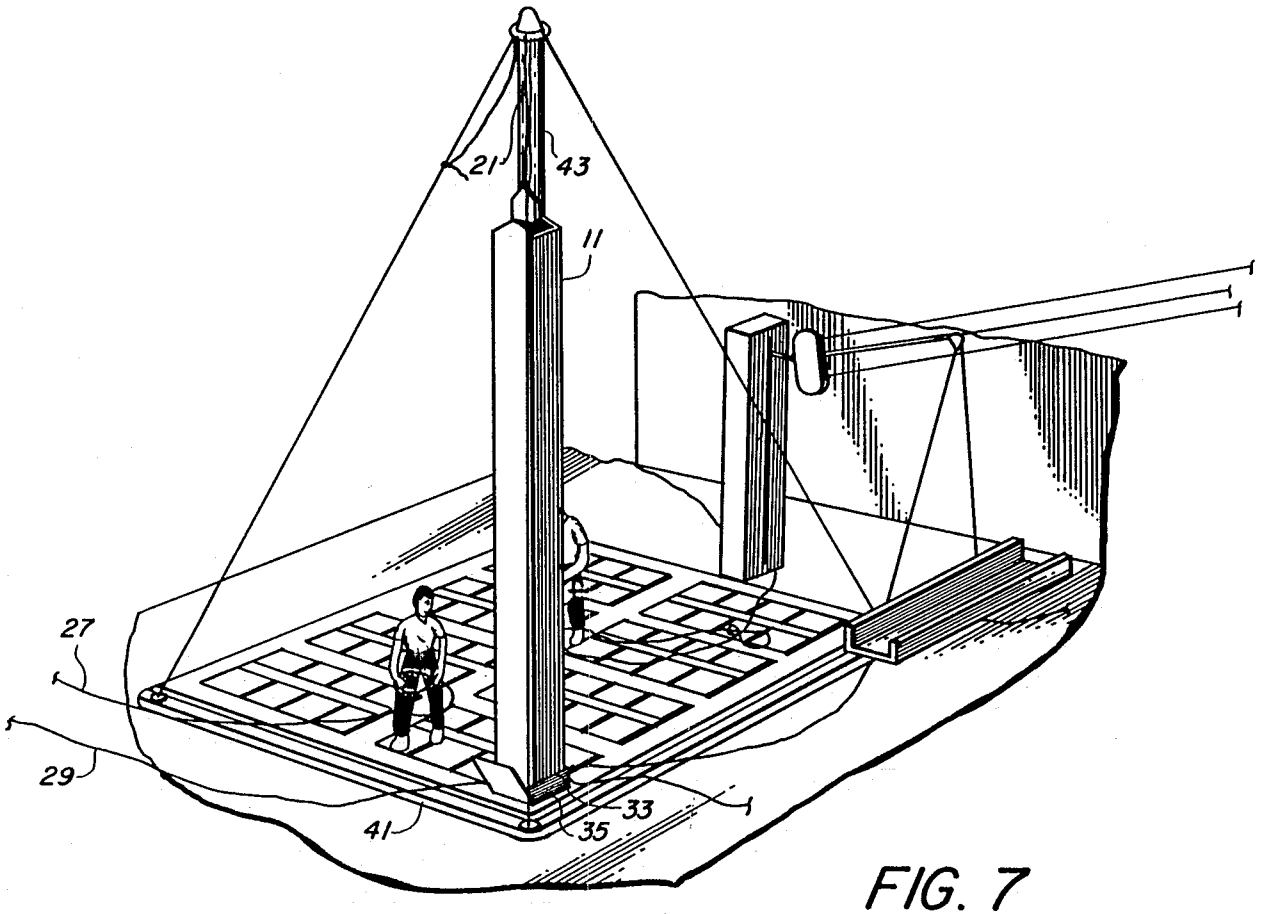

While step 3 may take a variety of forms, conveniently it may take the form of attaching a pair of lines 27, 29 to diagonally opposite corners of a collar 31 at the base of the upended canistered missile 11 (as shown in FIGS. 5 and 6); routing the free ends of the pair of lines 27, 29 through a cell guide 33 mounted in the cell 35 and around one-way rollers 37, 39 at the corners of the missile launcher 41 (as shown in FIGS. 5 and 6); and moving the boom 43 to position the upended canistered missile 11 over the cell 35 of the missile launcher 41 (as shown in FIG. 7).

Finally, in step 4 the canistered missile is lowered into the cell.

Figure 8:
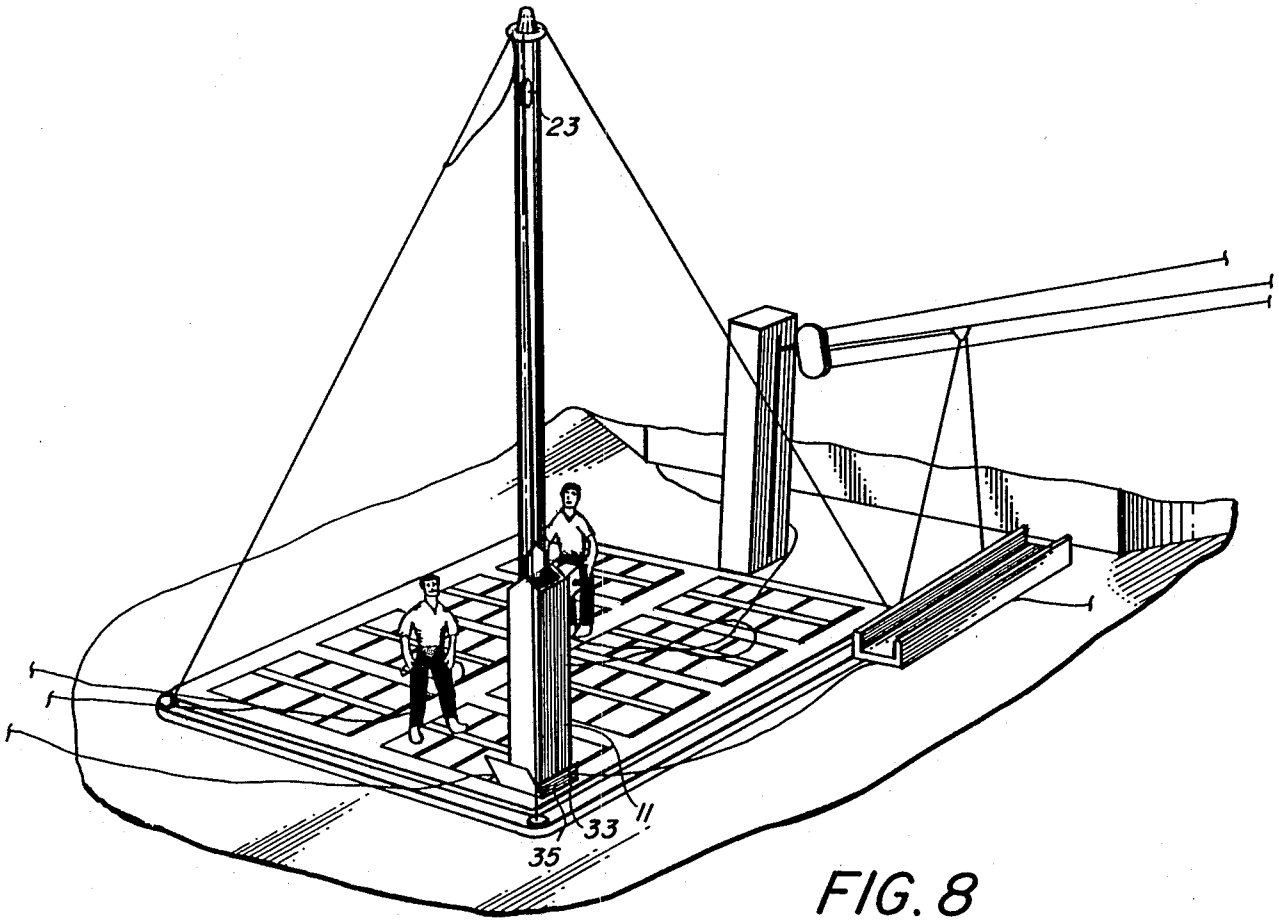

While step 4 may take a variety of forms, conveniently it may take the form of rotating the canistered missile 11 on the suspension cable 21 by means of the pair of lines 27, 29 to align the canistered missile with the cell guide 33 (as shown in FIG. 7); lowering the canistered missile 11 into the cell guide 33 by means of the boom winch 23 (as shown in FIG. 8); and decoupling the collar to allow the canistered missile 11 to be lowered though the collar and cell guide 33 to seat within the cell 35 of the missile launcher 41 (as shown in FIG. 8).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of loading a cell of a vertical launching system missile launcher on a combatant ship with a canistered missile from a supply ship comprising the steps of:

(a) transferring the canistered missile from the supply ship to a fixed guide on the deck of the combatant ship;

(b) upending the canistered missile in the guide;

(c) moving the upended canistered missile away from the guide to a position over the cell of the missile launcher; and (d) lowering the canistered missile into the cell.

2. The method recited in claim 1 wherein step (a) includes the step of:

conveying the canistered missile from the supply ship to the combatant ship by means of a ropeway using a first strongback.

3. The method recited in claim 2 wherein step (a) includes the further step of:

positioning the canistered missile on the ropeway over the fixed guide.

4. The method recited in claim 3 wherein step (a) includes the further step of:

lowering the ropeway to deposit the canistered missile in the guide.

5. The method recited in claim 4 wherein step (b) includes the step of:

connecting a suspension cable from a boom winch to one end of the canistered missile by means of a second strongback.

6. The method recited in claim 5 wherein step (b) includes the further step of:

disconnecting the first strongback from the canistered missile.

7. The method recited in claim 6 wherein step (b) includes the further step of:

raising the ropeway and returning the first strongback to the supply ship.

8. A method of loading a cell of a vertical launching system missile launcher on a combatant ship with a canistered missile from a supply ship comprising the steps of:

(a) conveying the canistered missile from the supply ship to the combatant ship by means of a ropeway using a first strongback;

(b) positioning the canistered missile on the ropeway over a fixed guide on the deck of the combatant ship;

(c) lowering the ropeway to deposit the canistered missile in the guide;

(d) connecting a suspension cable from a boom winch to one end of the canistered missile by means of a second strongback;

(e) disconnecting the first strongback from the canistered missile;

(f) raising the ropeway and returning the first strongback to the supply ship;

(g) hoisting the second strongback by means of the boom winch to upend the canistered missile in the guide;

(h) moving the upended canistered missile away from the guide to a position over the cell of the missile launcher; and (i) lowering the canistered missile into the cell.

9. The method recited in claim 8 wherein step (h) includes the step of:

attaching a pair of lines to diagonally opposite corners of a collar at the base of the upended canistered missile.

10. The method recited in claim 9 wherein step (h) includes the further step of:

routing the free ends of the pair of lines through a cell guide mounted in the cell and around one-way rollers at the corners of the missile launcher.

11. The method recited in claim 10 wherein step (h) includes the further step of:

moving the boom to position the upended canistered missile over the cell of the missile launcher.

12. The method recited in claim 11 wherein step (i) includes the step of:

rotating the canistered missile on the suspension cable by means of the pair of lines to align the canistered missile with the cell guide.

13. The method recited in claim 12 wherein step (i) includes the further step of :

lowering the canistered missile into the cell guide by means of the boom winch.

14. A method of loading a cell of a vertical launching system missile launcher on a combatant ship with a canistered missile from a supply ship comprising the steps of:

(a) conveying the canistered missile from the supply ship to the combatant ship by means of a ropeway using a first strongback;

(b) positioning the canistered missile on the ropeway over a fixed guide on the deck of the combatant ship;

(c) lowering the ropeway to deposit the canistered missile in the guide;

(d) connecting a suspension cable from a boom winch to one end of the canistered missile by means of a second strongback;

(e) disconnecting the first strongback from the canistered missile;

(f) raising the ropeway and returning the first strongback to the supply ship;

(g) hoisting the second strongback by means of the boom winch to upend the canistered missile in the guide;

(h) attaching a pair of lines to diagonally opposite corners of a collar at the base of the upended canistered missile;

(i) routing the free ends of the pair of lines through a cell guide mounted in the cell and around one-way rollers at the corners of the missile launcher;

(j) moving the boom to position the upended canistered missile over the cell of the missile launcher;

(k) rotating the canistered missile on the suspension cable by means of the pair of lines to align the canistered missile with the cell guide;

(l) lowering the canistered missile into the cell guide by means of the boom winch; and (m) decoupling the collar to allow the canistered missile to be lowered through the collar and cell guide to seat within the cell of the missile launcher.

* * * * *